(12) United States Patent
Wang et al.

(10) Patent No.: US 12,502,774 B2
(45) Date of Patent: Dec. 23, 2025

(54) ROBOTIC ARM OPERATING SYSTEM

(71) Applicant: HIWIN TECHNOLOGIES CORP., Taichung (TW)

(72) Inventors: Hsin-Fu Wang, Taichung (TW); Shun-Kai Chang, Taichung (TW); Yen-Shun Huang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 651 days.

(21) Appl. No.: 17/974,862

(22) Filed: Oct. 27, 2022

(65) Prior Publication Data

US 2024/0139944 A1    May 2, 2024

(51) Int. Cl.
*G08B 21/00*    (2006.01)
*B25J 9/16*    (2006.01)
*B25J 19/00*    (2006.01)

(52) U.S. Cl.
CPC .......... *B25J 9/1664* (2013.01); *B25J 19/0004* (2013.01)

(58) Field of Classification Search
CPC .... B25J 9/1664; B25J 19/0004; B25J 9/1674; G05B 2219/40218
USPC ........................................................ 340/453
See application file for complete search history.

(56) References Cited

U.S. PATENT DOCUMENTS

| | | | |
|---|---|---|---|
| 2009/0216372 A1* | 8/2009 | Watanabe | B25J 9/1674 700/245 |
| 2014/0000355 A1* | 1/2014 | Shikagawa | G01L 5/28 73/118.01 |
| 2023/0010560 A1* | 1/2023 | Wehrmann | B60T 13/746 |
| 2023/0173678 A1* | 6/2023 | Monreal | B25J 9/1674 700/245 |
| 2023/0173679 A1* | 6/2023 | Fujiki | B25J 19/0004 73/865.9 |
| 2023/0294310 A1* | 9/2023 | Lee | B60L 3/0092 |

* cited by examiner

*Primary Examiner* — Mark S Rushing
(74) *Attorney, Agent, or Firm* — MUNCY, GEISSLER, OLDS & LOWE, P.C.

(57) ABSTRACT

The robotic arm operating system includes a control device, a plurality of joint devices and a brake release monitoring device. The control device is used to generate an operation instruction. The joint device is coupled to the control device. Each joint device includes a motor and a driver. The drivers of the joint devices receive the operation instruction to generate corresponding multiple unlocking signals. The unlocking signals are used to release a braking state of the motors of the corresponding joint devices. The brake release monitoring device is coupled to the control device and the joint devices, and includes a plurality of monitoring circuits. When one of the plurality of monitoring circuits does not receive the corresponding unlocking signal, the brake release monitoring device notifies the control device that the operation instruction is not allowed.

6 Claims, 5 Drawing Sheets

ROBOTIC ARM OPERATING SYSTEM

BACKGROUND OF THE INVENTION

1. Field of the Invention

The present invention relates to robotic arm technology and more particularly, to an operating system of a robotic arm.

2. Description of the Related Art

The operation of the robotic arm is to control the joint device of each axis (joint) of the robotic arm through the operation command of the control device. The joint device includes a motor and a driver. After the robotic arm is powered off or the previous run is over, the motor's brake mechanism will be closed to lock the motor. Therefore, when a new operation command is to be executed, after the control device sends the operation command to the driver of the joint device, the driver will supply the brake release power to the motor, so that the brake mechanism can release the brake and release the motor. In this way, the motor can operate normally according to the running command.

However, in practice, the driver may fail or malfunction, and the brake release power is not sent, indicating that the motor has not been released. Then, the driver continues to execute the operation command of the control device to drive the motor, so forcing the locked motor to run will cause wear or burn out.

SUMMARY OF THE INVENTION

The present invention has been accomplished under the circumstances in view. It is the main object of the present invention to provide a reliable and safe robotic arm operating system.

The robotic arm operating system according to the present invention comprises a control device, a plurality of joint devices and a brake release monitoring device. The control device is for generating an operation instruction. The joint devices are coupled to the control device. Each joint device comprises a motor and a driver. The drivers of the joint devices receive the operation instruction to generate a plurality of unlocking signals. One of the unlocking signals corresponding to one of the drivers. The plurality of unlocking signals are used to release a braking state of the corresponding motors. The brake release monitoring device is coupled to the control device and the joint devices. The brake release monitoring device comprises a plurality of monitoring circuits. The monitoring circuits correspond to the joint devices and are used to receive the plurality of unlocking signals to release the braking state, and notify the control device to allow execution of the operation instruction, so that the motors of the joint devices operate according to the operation instruction. When one of the monitoring circuits does not receive the corresponding unlocking signal, the brake release monitoring device notifies the control device that the operation instruction is not allowed to be executed.

In this way, the robotic arm operating system of the present invention can monitor whether the drivers normally output the unlocking signal in a one-to-one manner through the monitoring circuits of the brake release monitoring device corresponding to the number of joint devices to confirm the status of the drivers, and then feedback the status of receiving the unlocking signal to the control device to avoid motor damage or burning.

The detailed structure, characteristics and manufacturing method of the robotic arm operating system will be explained in the following preferred embodiments. However, it should be understood that the preferred embodiments and drawings described below are only illustrative, and should not be used to limit the scope of the patent application of the present invention.

DETAILED DESCRIPTION OF THE INVENTION

The technical content and features of the present invention will be described in detail below by means of the enumerated embodiments in conjunction with the drawings. The terms "connection" or "coupling" mentioned in the content of this specification are only terms that normally form electrical conduction or connection, and are not intended to limit the scope of the claim.

Figure 1:
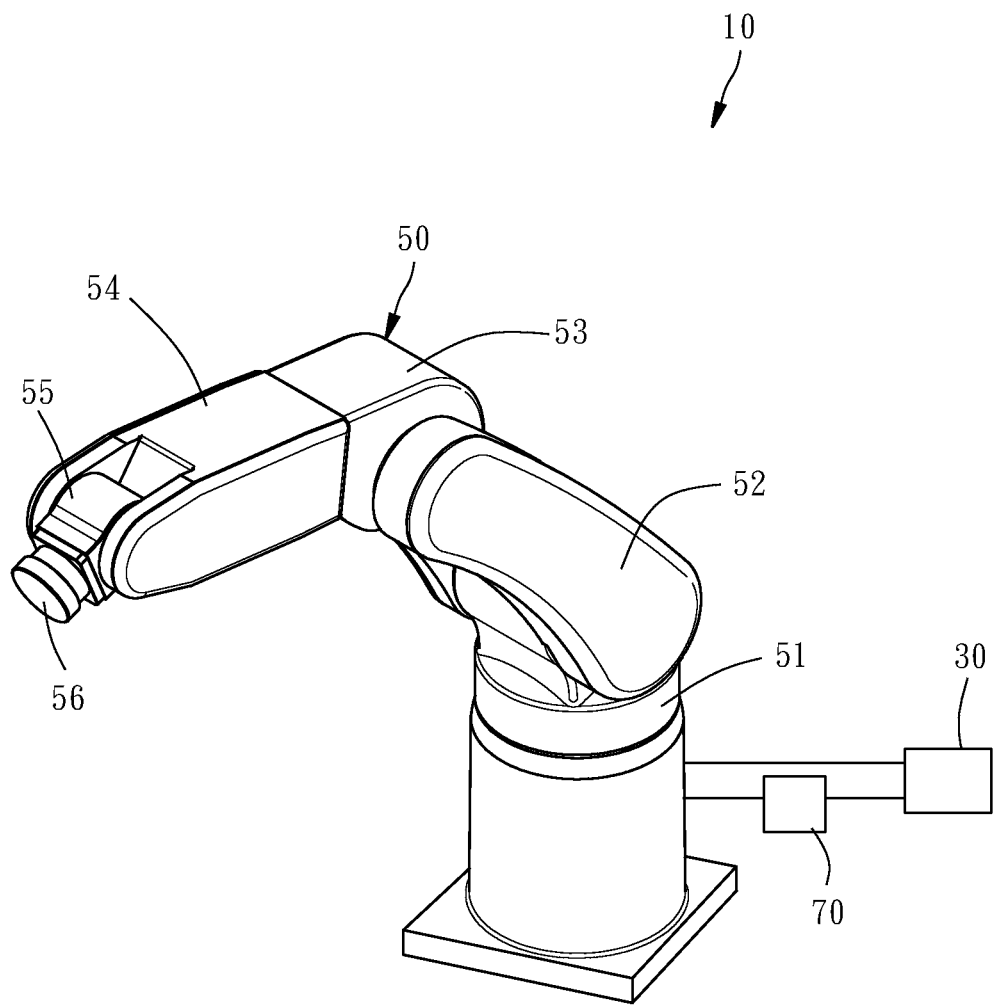
FIG. 1 is the schematic diagram of robotic arm operating system of the present invention.
Figure 2:
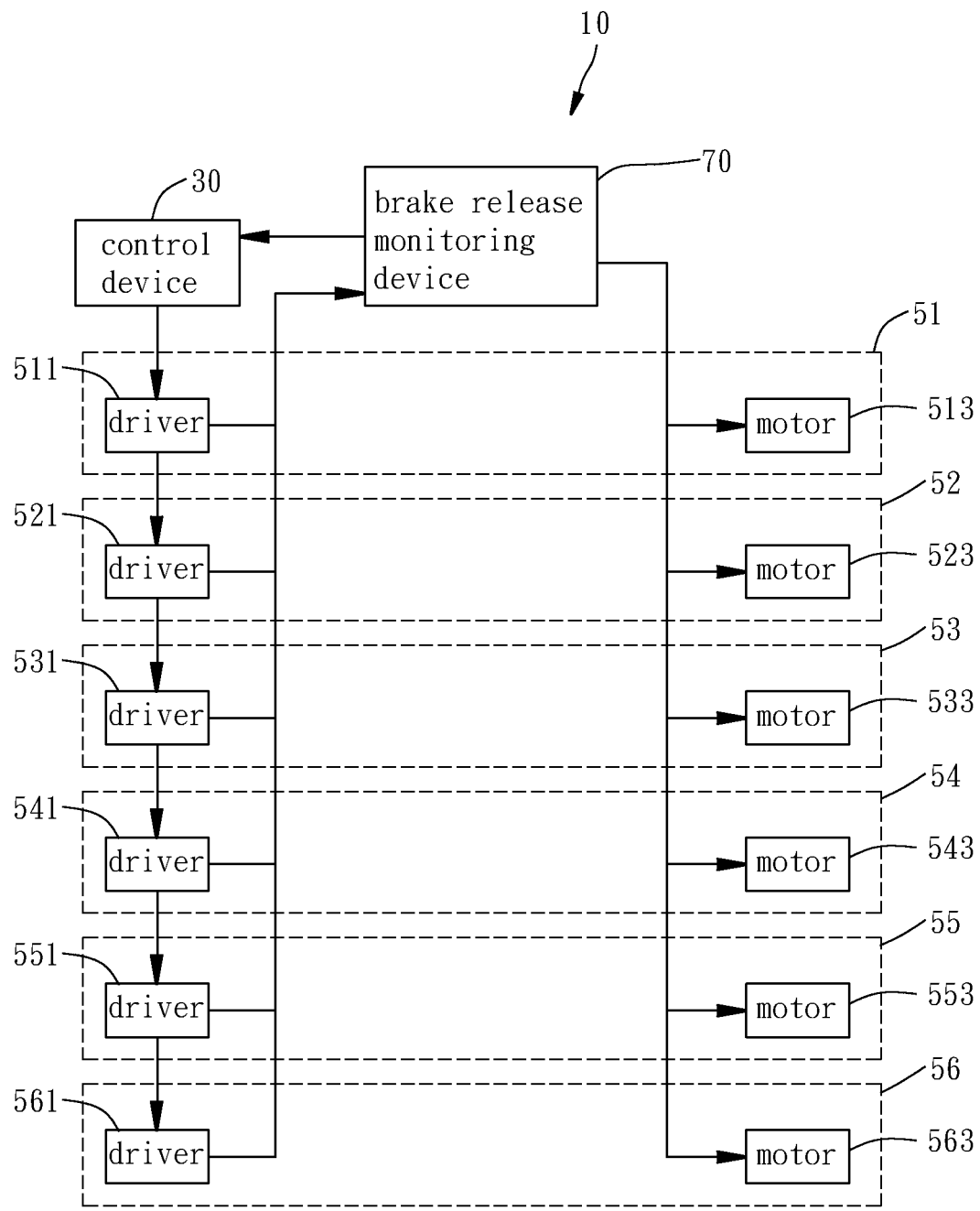
FIG. 2 is a block diagram of the operating system in FIG. 1.

In order to illustrate the technical characteristics of the present invention in detail, the following examples are hereby given and described in conjunction with the drawings as follows, wherein:

As shown in FIG. 1 and FIG. 2, FIG. 1 is a schematic diagram of the operating system 10 of the present invention applied to the robotic arm 50, and FIG. 2 is a block diagram of the composition of the operating system 10.

The operating system 10 comprises a control device 30, six joint devices 51-56 and a brake release monitoring device 70.

The control device 30 is used to generate an operation instruction. The operation instruction includes the unlocking and operation plan of each joint device 51-56 that needs to be operated during operation, so that each joint device 51-56 executes actions according to the operation plan.

Each of the joint devices 51-56 is coupled to the control device 30. Each joint device 51-56 comprises a driver 511-561 and a motor 513-563. The drivers 511-561 of the joint devices 51-56 receive the operation instruction to generate corresponding six unlocking signals, and the unlocking signals are used to release a braking state of the motors 513-563 of the corresponding joint devices 51-56. In the braking state, the motor 513-563 cannot be run or run. After the braking state is released, the motor 513-563 can be released to run or run freely, that is, to execute the operation plan.

The brake release monitoring device 70 is coupled to the control device 30 and each of the joint devices 51-56, and comprises six monitoring circuits 71-76. Each of the monitoring circuits 71-76 is correspondingly connected to each of the joint devices 51-56, and receives the corresponding each of the unlocking signals to release the braking state, and informs the control device 30 that the operation instruction is allowed to be executed, so that the motors 513-563 operate according to the operation instruction.

When one of the monitoring circuits 71-76 does not receive the unlocking signal, the brake release monitoring device 70 notifies the control device 30 that the execution of the operation instruction is not allowed. One of monitoring circuits 71-76 means any one or more than one (e.g., two, three, four, five, six). In this case, the control device 30 does not allow the joint devices 51-56 to execute the operation plan in the operation instruction, so as to avoid the damage caused by the forcible operation of the motors 513-563 in the braking state.

In addition, judging whether an unlocking signal is received is for monitoring circuits 71-76 that have been selected to be enabled. In other embodiments, when only three of the six are selected to be enabled, the above-mentioned judgment of receiving the unlocking signal is for the monitoring circuits that have been enabled, and the remaining ones that are not enabled are not judged or confirmed. Of course, in other embodiments, the number of monitoring circuits 71-76 selected to be enabled may be more or less, and the above examples are not limited.

Figure 3:
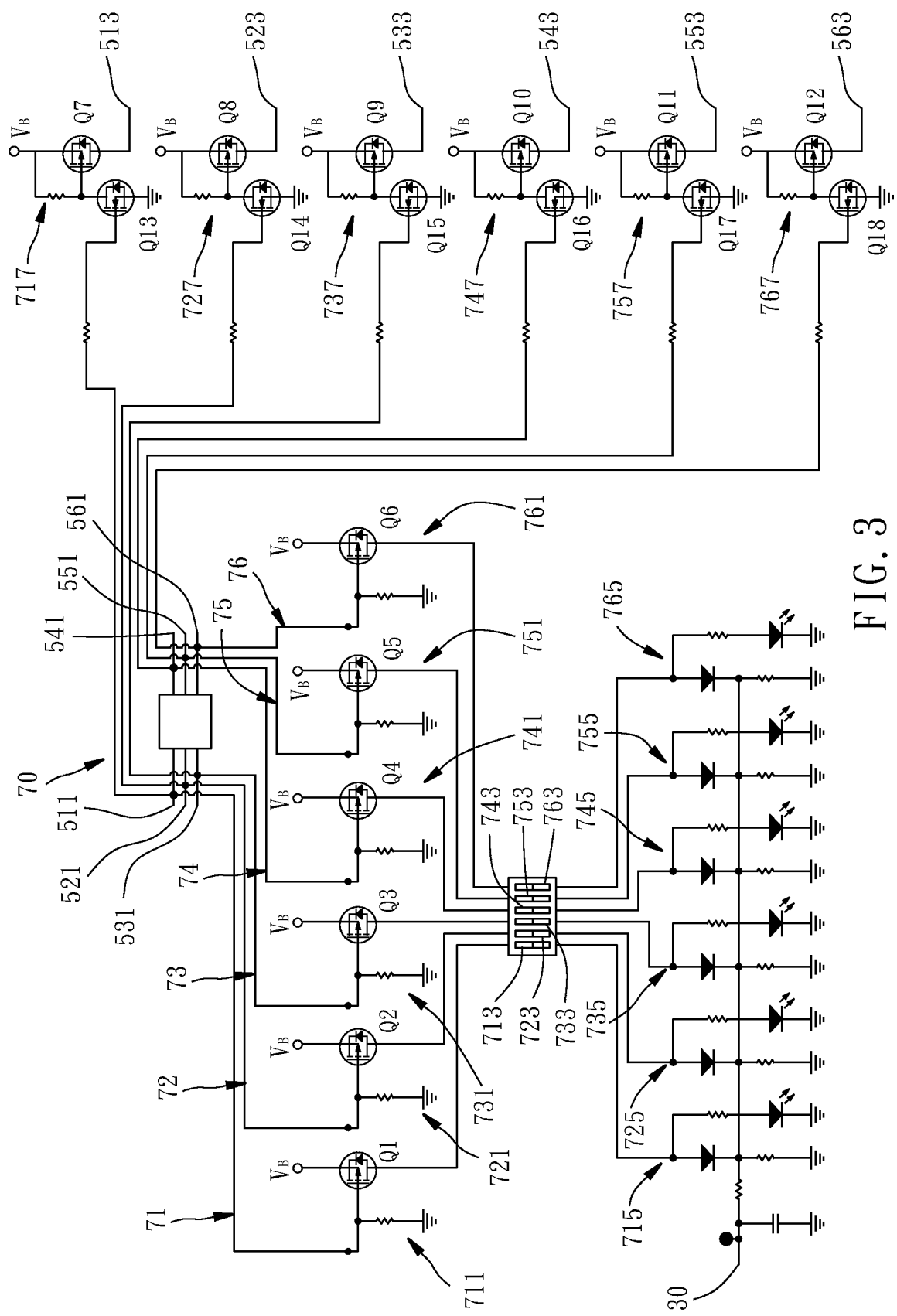
FIG. 3 is a circuit diagram of the first embodiment of the brake release monitoring device in FIG. 2.

As shown in FIG. 3, FIG. 3 is a circuit diagram of the first embodiment of the brake release monitoring device. Each of the monitoring circuits 71-76 has the same composition, each of which comprises a signal detection unit 711-761, a switch unit 713-763, a notification unit 715-765, and a power processing unit 717-767.

The signal detection units 711-761 are respectively connected to the drivers 511-561 and used to receive the unlocking signal. In this embodiment, the signal detection units 711-761 include input transistors Q1-Q6, and the input transistors Q1-Q6 are P-channel field effect transistors (PMOSFETs). The gates of the input transistors Q1-Q6 are connected to the drivers 511-561 to receive the unlocking signal. The sources of the input transistors Q1-Q6 are connected to the unlocking power source VB.

The switch units 713-763 are respectively connected to the signal detection units 711-761 and the notification units 715-765. The drains of the input transistors Q1-Q6 are respectively connected to the input terminals of the switch units 713-763. The notification units 715-765 are respectively connected to the outputs of the switch units 713-763. In this embodiment, the switch units 713-763, such as dual in-line package (DIP) switches, are used to select the monitoring circuits 71-76 used and unused. For example, when only three of the six joint devices are to be used, the switches corresponding to the three joint devices are turned on through switch units 713-763, and the switch units 713-763 corresponding to the unused joint devices are kept off to preserve the flexibility of the joint devices.

The notification units 715-765 are connected to the control device 30, and notify the control device 30 whether an unlocking signal is received according to the operation of the signal detection units 711-761. In this embodiment, each notification unit 715-765 is composed of the same circuit, such as diodes and light-emitting diodes. The diodes are connected to the switch units 713-763 and the control device 30 to notify the control device 30 of changing voltage or signal levels (such as high voltage and low voltage). The light-emitting diodes can be reminded by light, which is convenient for maintenance and monitoring.

When the gates of the input transistors Q1-Q6 receive the unlocking signal, the input transistors Q1-Q6 are turned off, therefore, the drains of the input transistors Q1-Q6 do not supply power to the switch units 713-763 and the notification units 715-765, but notify the control device 30 with a low voltage.

Conversely, abnormal states such as, when the gate of the input transistor Q3 does not receive the unlocking signal, but the gates of the other input transistors Q1-Q2 and Q4-Q6 receive the unlocking signal, the input transistor Q3 will be turned on, and the input transistors Q1-Q2 and Q4-Q6 will be cut off. Therefore, the drains of the input transistors Q1-Q2 and Q4-Q6 will not supply power to the switch units 713-723, 743-763 and the notification units 715-725, 745-765, but the drain of the input transistor Q3 can supply power to the switch unit 733 and the notification unit 735. Therefore, the notification unit 735 notifies the control device 30 that there is an abnormality with a high voltage, so that the control device 30 outputs a stop instruction, so that the drivers 511-561 cannot execute or stop executing the operation instruction.

The power processing units 717-767 are connected to the unlocking power source VB, the corresponding drivers 511-561 and motors 513-563 of the joint devices 51-56, and supply the unlocking power source VB to the motors 513-563 corresponding to the unlocking signal to release the brake mechanism of the motors 513-563.

In this embodiment, the power processing units 717-767 comprise trigger elements and power supply transistors Q7-Q12. The trigger elements are connected to the power supply transistors Q7-Q12 and the corresponding drivers 511-561 of the joint devices 51-56. The trigger elements trigger the power supply transistors Q7-Q12 to turn on according to the unlocking signal to supply the unlocking power source VB to the motors 513-563. When the unlocking signal is not received, the trigger elements will not turn on the power supply transistors Q7-Q12.

Trigger elements such as N-channel field effect transistors (NMOSFET) Q13-Q18, power supply transistors Q7-Q12 such as P-channel field effect transistors (PMOSFET), the gates of the N-channel field effect transistors Q13-Q18 are connected to the drivers 511-561 of the joint devices 51-56, the sources of the N-channel field effect transistors Q13-Q18 are connected to the ground terminal, and the drains of the N-channel field effect transistors Q13-Q18 are connected to the unlocking power source VB and the gates of the power supply transistors Q7-Q12. The sources of the power supply transistors Q7-Q12 are connected to the unlocking power source VB, and the drains of the power supply transistors Q7-Q12 are respectively connected to the motors 513-563 of the joint devices 51-56.

When the gates of the N-channel field effect transistors Q13-Q18 normally receive the unlocking signal, the N-channel field effect transistors Q13-Q18 trigger the power supply transistors Q7-Q12 to turn on, so that the drains of the power supply transistors Q7-Q12 supply the unlocking power source VB to the motors 513-563 of the joint devices 51-56, so that the motors 513-563 can complete the unlocking, and then the motors 513-563 can execute the operation instruction normally.

Continuing the above exception example, when an exception occurs, the unlocking power source VB cannot be transmitted to motor 533.

Figure 4:
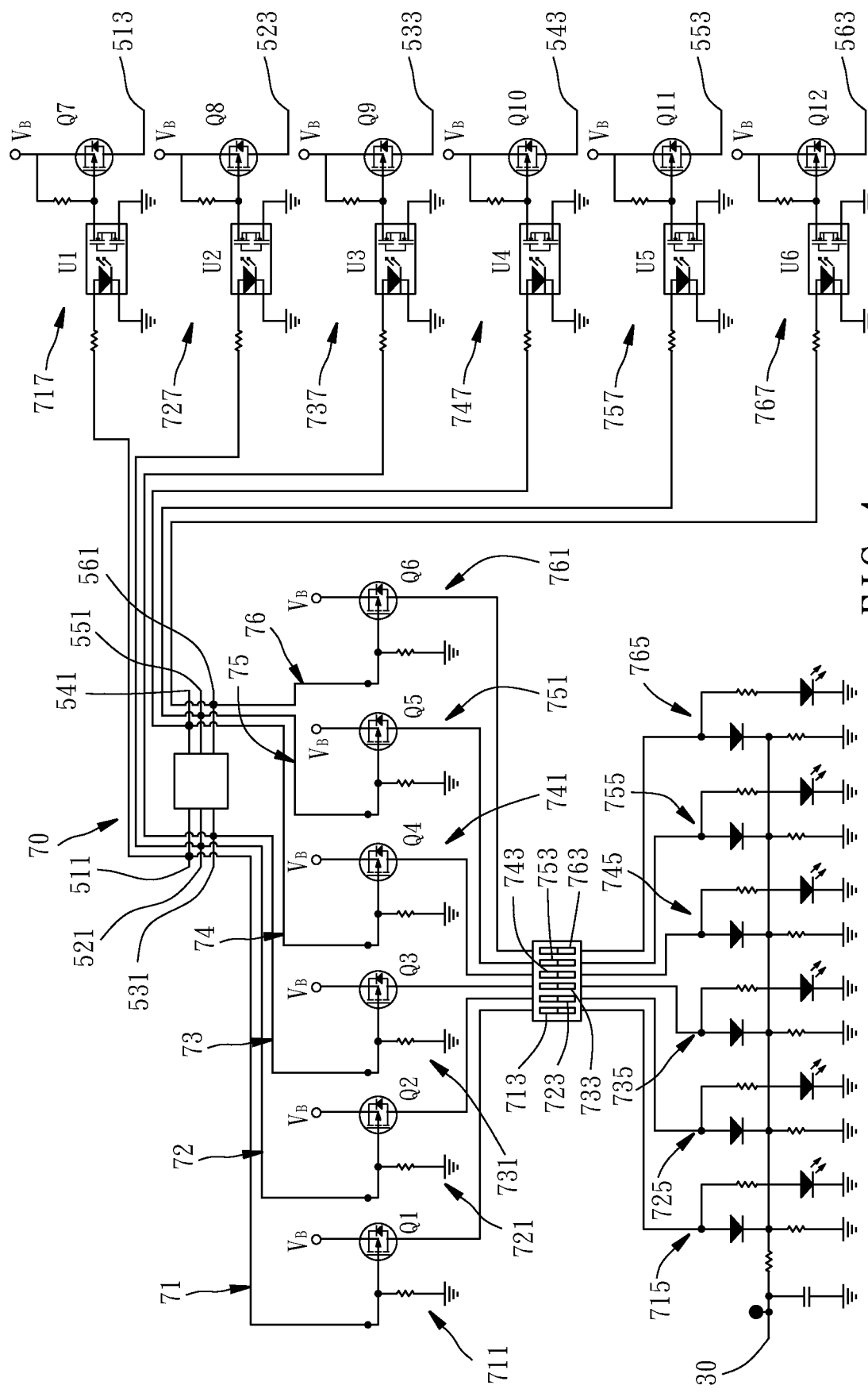
FIG. 4 is a circuit diagram of the second embodiment of the brake release monitoring device in FIG. 2.

As shown in FIG. 4, FIG. 4 is a circuit diagram of the second embodiment of the brake release monitoring device. Compared with FIG. 3, the difference lies in the trigger elements. The trigger elements in FIG. 3 are field effect transistors as an example, and the trigger elements in FIG.

4 is an example of the optocouplers U1-U6. The composition and operation of the same parts will not be repeated here.

When the drivers 511-561 of the joint devices 51-56 normally output the unlocking signal, the optocouplers U1-U6 will be turned on to trigger the conduction of the power supply transistors Q7-Q12, so that the drains of the power supply transistors Q7-Q12 supply the unlocking power source VB to the motors 513-563 of the joint devices 51-56 to release the motors 513-563, then, motors 513-563 can execute the operation instruction normally.

Similarly, when at least one of the drivers 511-561 of the joint devices 51-56 does not output the unlocking signal normally, any optocoupler U1-U6 that does not receive the unlocking signal will not be turned on, so the power supply transistors Q7-Q12 will not be triggered either.

Figure 5:
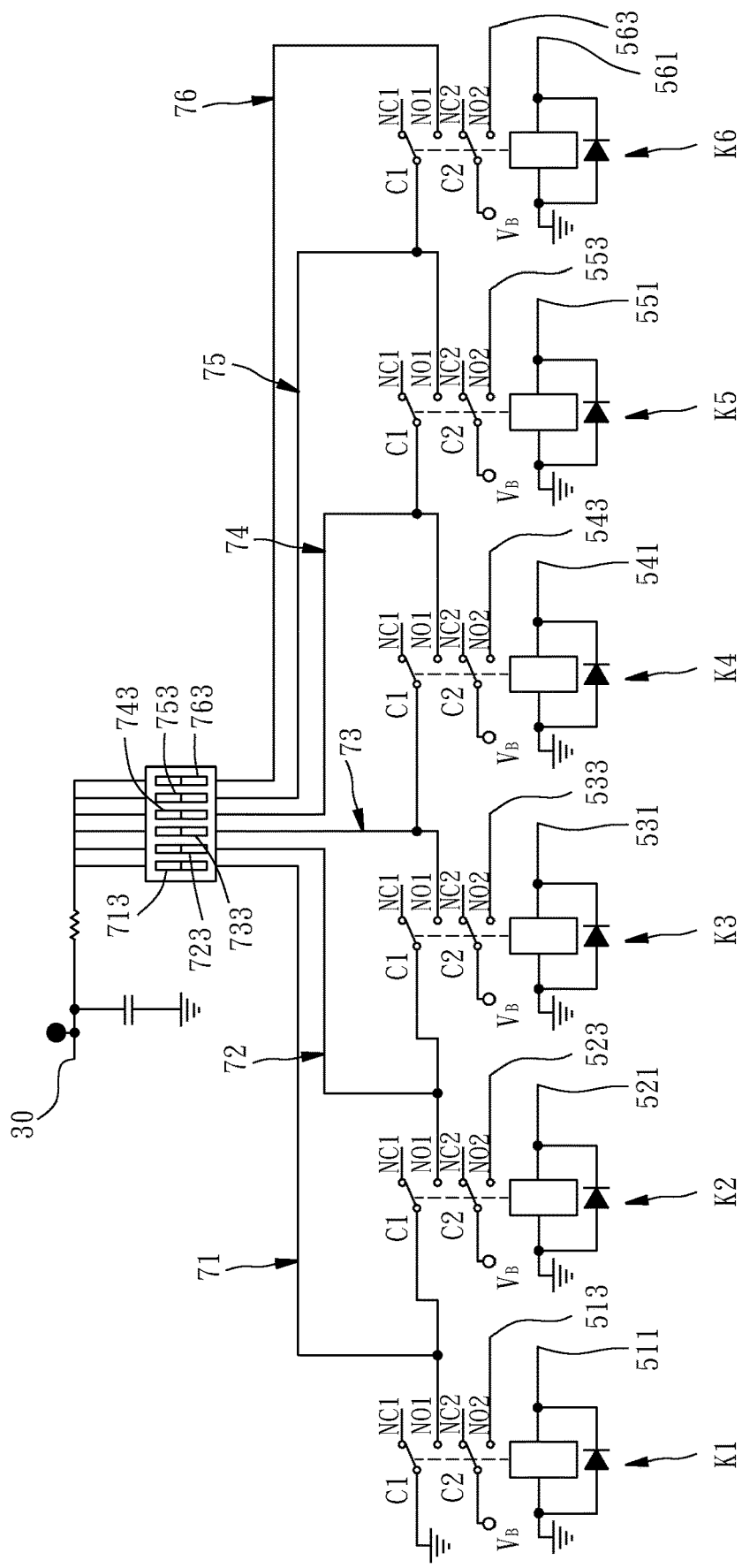
FIG. 5 is a circuit diagram of the third embodiment of the brake release monitoring device in FIG. 2.

As shown in FIG. 5, FIG. 5 is a circuit diagram of the third embodiment of the brake release monitoring device. Each monitoring circuit 71-76 comprises a relay K1-K6 and a switch unit 713-763. The switch units 713-763 are connected to the relays K1-K6 and the control device 30. The relay K1-K6 comprises a control coil, a first common contact C1, a first normally closed contact NC1, a first normally open contact NO1, a second common contact C2, a second normally closed contact NC2, and a second normally open contact NO2. The control coils are connected to the drivers 511-561 of the corresponding joint devices 51-56. The first common contact C1 of the relay K1 is connected to ground. The first normally open contacts NO1 of the relays K1-K6 is connected to the corresponding switch units 713-763 and the first common contacts C1 of the relays K2-K6. The second common contacts C2 are connected to the unlocking power source VB. The second normally open contacts NO2 are connected to the motors 513-563 of the corresponding joint devices.

When the control coils normally receive the unlocking signal sent by the drivers 511-561, the switch of the relays K1-K6 will switch from the normally closed contacts NC1 and NC2 to the normally open contacts NO1 and NO2 to notify the control device 30 through the first normally open contacts NO1 and the switch units 713-763, so that the control device 30 controls the drivers 511-561 of the joint devices 51-56 to execute the operation instruction. The unlocking power source VB can supply power to the motors 513-563 through the second normally open contacts NO2 to release the motors 513-563.

Similarly, when the control coil of any relay K1-K6 does not receive the unlocking signal, the switch of the relay K1-K6 that does not receive the unlocking signal remains at the normally closed contacts NC1 and NC2. In this way, the state (e.g., high voltage level) of the relay K1-K6 that has not received the unlocking signal fed back to the control device 30 is different from the state (e.g., low voltage level) of the other relays K1-K6 that have received the unlocking signal fed back to the control device 30. Therefore, the control device 30 outputs the stop instruction and does not allow the execution of the operation instruction, so as to avoid the motor 513-563 from being worn out or burned out.

Although the above-mentioned embodiments take the six-axis robotic arm as an example, in other embodiments, the number of joint devices and monitoring circuits may be more or less, for example, more than six-axis, or, for example, only two-axis or three-axis, four or five axes. Therefore, the operating system of the present invention is not limited to six axes.

Through the above embodiments, those skilled in the art can understand the technology and purpose of the hardware configuration of the robotic arm operating system of the present invention. Therefore, the above configuration of transistors (including N-channel or P-channel) or relays can also be changed in hardware through the number or arrangement of logic elements to achieve the same technology and purpose. Therefore, the transistors and relays described in the examples are not intended to limit the scope of the claims. In addition, the aforementioned confirmation of the unlocking signal transmission state by the high and low voltage levels is only used to illustrate the present invention. In other embodiments, the judgment can be made through logic contrary to the present invention. For example, the low voltage level represents that no unlocking signal has been received.

What is claimed is:

1. A robotic arm operating system, comprising:
a control device for generating an operation instruction;
a plurality of joint devices coupled to the control device, each the joint device comprising a motor and a driver, the drivers of the joint devices receiving the operation instruction to generate a plurality of unlocking signals, one of the plurality of unlocking signals corresponding to one of the drivers, and the plurality of unlocking signals being used to release a braking state of the motors; and
a brake release monitoring device coupled to the control device and the plurality of joint devices, the brake release monitoring device comprising a plurality of monitoring circuits, the plurality of monitoring circuits corresponding to the plurality of joint devices and being used to receive the plurality of unlocking signals to release the braking state, and notifying the control device to allow execution of the operation instruction, so that the motors of the plurality of joint devices operate according to the operation instruction;
wherein when one of the plurality of monitoring circuits does not receive the unlocking signal, the brake release monitoring device notifies the control device that the operation instruction is not allowed to be executed; and
wherein each the monitoring circuit comprises a relay and a switch unit, the switch unit connecting the relay and the control device, the relay comprising a control coil, a first common contact, a first normally closed contact, a first normally open contact, a second common contact, a second normally closed contact and a second normally open contact, the control coils connecting the drivers of the plurality of joint devices, one of the first common contacts being connected to a ground terminal, while the others being connected to the first normally open contacts, the first normally open contacts connecting the switch units, the second common contacts being connected to an unlocking power source, the second normally open contacts being connected to the motors of the plurality of joint devices.

2. The robotic arm operating system as claimed in claim 1, wherein each the monitoring circuit comprises a signal detection unit, a switch unit, a notification unit and a power processing unit, the signal detection unit being connected to the driver of one respective the joint device and being used to receive the unlocking signal, the switch unit connecting the signal detection unit and the notification unit, the notification unit being connected to the control device and notifying the control device whether the notification unit has received the unlocking signal according to the operation of the signal detection unit, the power processing unit being connected to an unlocking power source and the driver and the motor of one respective the joint device and supplying the unlocking power source to the corresponding the motor according to the unlocking signal.

3. The robotic arm operating system as claimed in claim 2, wherein the signal detection unit comprises a transistor that operates according to the unlocking signal.

4. The robotic arm operating system as claimed in claim 2, wherein the power processing unit comprises a trigger element and a power supply transistor, the trigger element connecting the power supply transistor and the driver of one respective the joint device, the trigger element triggering the power supply transistor to turn on according to the unlocking signal to supply the unlocking power source to the respective the motor, the trigger element being unable to trigger the power supply transistor to turn on when the unlocking signal is not received.

5. The robotic arm operating system as claimed in claim 4, wherein the trigger element comprises a transistor.

6. The robotic arm operating system as claimed in claim 4, wherein the trigger element comprises an optocoupler.

* * * * *